United States Patent

[11] 3,628,162

[72] Inventors Peter Lison Lunden;
Anders Gustaf Lyden, both of Jakobsberg, Sweden
[21] Appl. No. 838,161
[22] Filed July 1, 1969
[45] Patented Dec. 14, 1971
[73] Assignee U.S. Philips Corporation
New York, N.Y.
[32] Priorities July 2, 1968
[33] Sweden
[31] 9115/68;
July 10, 1968, Sweden, No. 9525/68

[54] ENVELOPE DELAY CORRECTION LINK

14 Claims, 24 Drawing Figs.

[52] U.S. Cl. .......... 328/155, 307/295, 328/133, 330/124, 333/76, 333/80
[51] Int. Cl. .......... H03b 3/04
[50] Field of Search .......... 328/155, 133; 333/76, 80 T; 330/124, 126; 178/69.5 DC; 307/295

[56] References Cited

UNITED STATES PATENTS

| | | | |
|---|---|---|---|
| 2,376,392 | 5/1945 | Shepherd | 323/119 |
| 2,531,474 | 11/1950 | Saxton | 328/155 |
| 2,776,410 | 1/1957 | Guanella | 330/124 X |
| 3,248,663 | 4/1966 | Jacob | 330/124 |
| 3,271,693 | 9/1966 | Nicholson, Jr. | 330/30 X |
| 3,322,970 | 5/1967 | Batteau | 328/155 X |

*Primary Examiner*—Donald D. Forrer
*Assistant Examiner*—R. C. Woodbridge
*Attorney*—Frank R. Trifari

ABSTRACT: A circuit for correcting nonuniform transmission delay of a television signal has two parallel coupled channels coupled to receive said signal. The first contains a damped resonant circuit, the second a phase inverter. A MOSFET can be the variable damping, while voltage variable diodes can be in the tuned circuit. A rectifier supplies a control voltage from the input signal to the diodes.

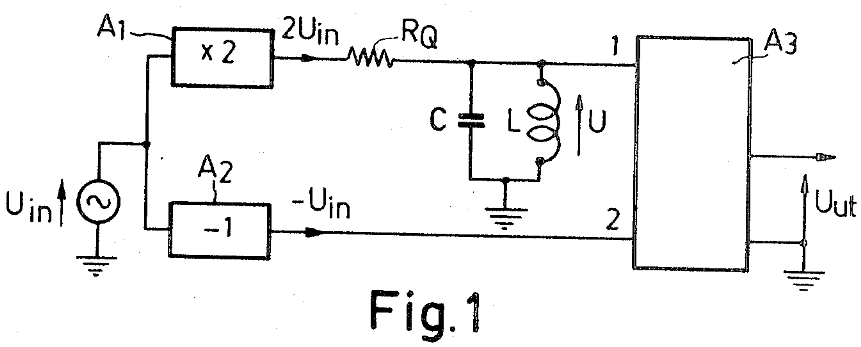
Fig.1
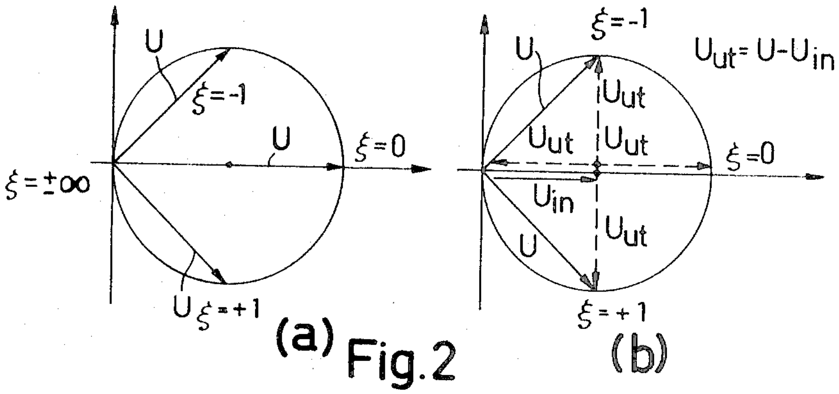
(a) Fig.2 (b)
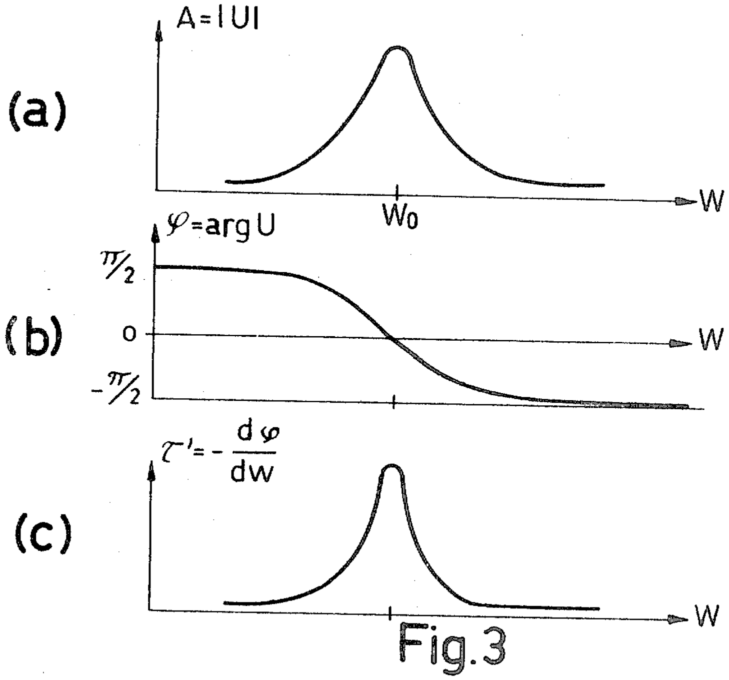
Fig.3
INVENTORS
PETER L. LUNDEN
ANDERS G. LYDEN
BY
AGENT

INVENTORS
PETER L. LUNDEN
ANDERS G. LYDEN
BY
AGENT

INVENTORS.
PETER L. LUNDEN
ANDERS G. LYDEN
BY
AGENT

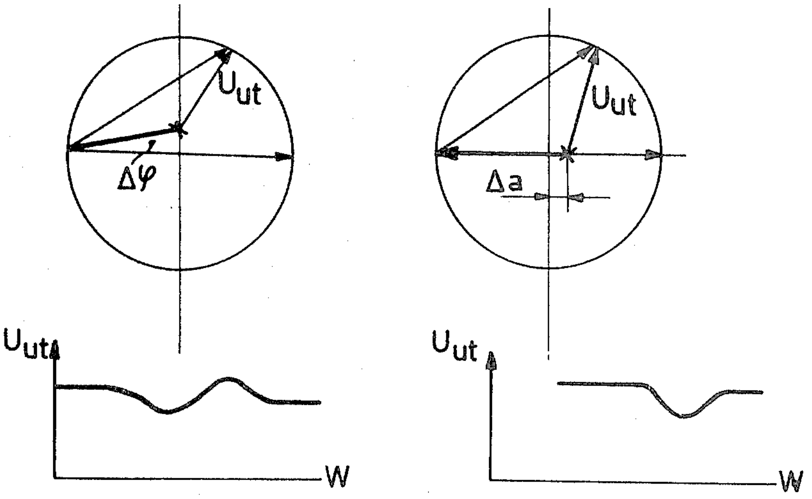
(a) Fig.8 (b)
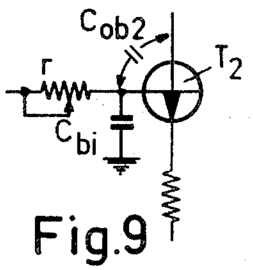
Fig.9
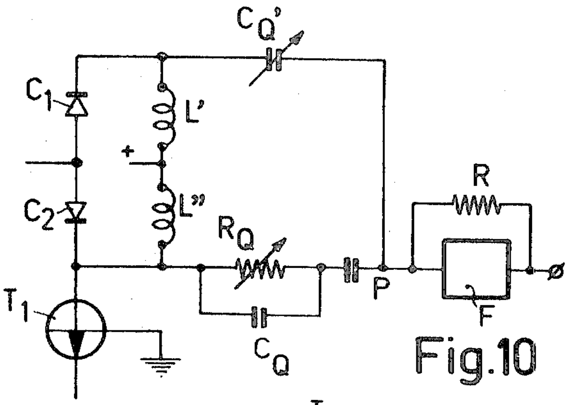
Fig.10
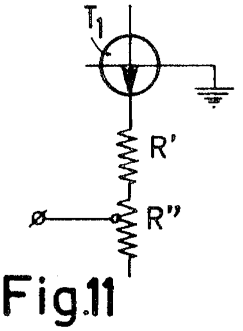
Fig.11
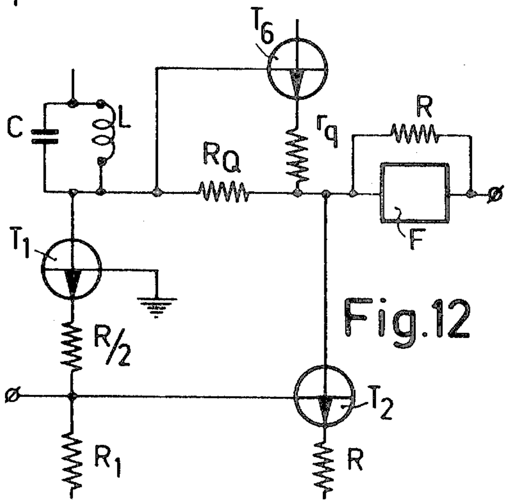
Fig.12
INVENTORS.
PETER L. LUNDEN
ANDERS G. LYDEN
BY
F. R. Trifari
AGENT

INVENTORS.
PETER L. LUNDEN
ANDERS G. LYDEN
BY
AGENT

INVENTORS
PETER L. LUNDEN
ANDERS G. LYDEN
BY
AGENT

INVENTORS.
PETER L. LUNDEN
ANDERS G. LYDEN
BY
AGENT

ENVELOPE DELAY CORRECTION LINK

The invention relates to a delay correction circuit having a transfer function the absolute value of which is substantially independent of the frequency and the phase angle is dependent on the frequency, comprising a first signal source coupled to a signal input of the delay correction circuit, a second signal source coupled to the signal input, a reactance coupled to an output of the first signal source ~ and a combination circuit of an output coupled to the said signal sources and the reactance from which output may be derived the desired output signal whose phase can be influenced.

Such a circuit is known from German Patent specification 1,200,869 and is usually called a delay correction circuit or a phase correction circuit, and is adapted to obtain an output signal from an input signal applied to the circuit which output signal has a constant amplitude ratio relative to the input signal, but a frequency-dependent phase shift. Such a circuit may be used in a signal-handling unit, for example, in the intermediate frequency section of a TV transmitter. The correction circuit provides a given correction of the delay time within a certain frequency range, but it has the same amplification for all frequencies. Such a circuit is sometimes called a "all-pass" circuit. The circuit may, for example, consist of only passive (reactive or resistive) elements and is then called a passive correction circuit, or it may consist of both passive and active elements and is then called an active correction circuit. The correction circuit is required to have the same amplification for all frequencies within the actual frequency range and it must be possible to adjust the delay correction to be obtained in a simple manner both as regards its magnitude and its position in the frequency band without influencing the amplitude ratio between the output signal and the input signal.

The invention provides a simple correction circuit which can easily be adjusted and satisfies the requirements for the amplitude with extremely high accuracy for all adjustments of the circuit, and which shows a more suitable phase characteristic than the circuits known from the Patent specification referred to above.

According to the invention a delay correction circuit of the kind described in the preamble is characterized in that the reactance includes a resonant circuit.

According to a preferred embodiment of the invention the resonant circuit includes at least one tuning element which is voltage- or current-dependent.

When using a controllable all-pass circuit in which two separately produced signals are combined in a special combination circuit, a phase correction produced by the circuit dependent on the amplitude of the first signal is possible by which the correction can be adapted to substantially any phase error characteristic of an uncorrected transmission circuit. Particularly the controllable all-pass circuit according to the invention provides a greater correction range than the known devices for correcting differential phase errors and allows in principle phase corrections of the magnitude of ±180°.

The differential phase error usually occurs on a final stage to which a modulated signal is applied. It is therefore physically correct to also carry out the correction on such a modulated signal. The controllable all-pass circuit is therefore preferably incorporated in a section of the transmission circuit where the combined signal is modulated on a carrier, for example, on an IF-carrier.

It is advantageous to carry out the phase correction such that the relationship between the supplied control voltage and the produced phase correction is linear, the correction being adapted to a nonlinear phase error characteristic (phase error as a function of the instantaneous value of the first signal) by producing a control voltage which is nonlinearly related to the instantaneous value of the first signal. For a correction which is carried out on a carrier frequency, for example, intermediate frequency, this can be achieved by generating the control voltage by means of a device comprising a number of demodulators which have different threshold values each supplying a voltage which after exceeding the threshold value increases linearly with the detected first signal, and an adding device for adding the voltages supplied by the demodulators, the threshold value of the demodulators and the adding constants for the different voltages being so adapted that the control voltage, which is derived from the output of the adding device, substantially forms the inverse function of the actual phase error characteristic.

The dependency of the delay correction of the first signal produced by the correction circuit or circuits may be varied by a variation of the tuning of the resonant circuit. This may be effected by influencing controllable reactive elements, such as controllable capacitors and/or inductors included in the resonant circuit, dependent on the control voltage. It is alternatively possible to vary the Q-value by influencing controllable resistive elements such as, for example, field-effect transistors included in the resonant circuit by means of the control voltage.

In order that the invention may be readily carried into effect, a few embodiments thereof will now be described in detail by way of example with reference to the accompanying diagrammatic drawings, in which:

FIG. 1 diagrammatically shows an all-pass circuit according to the invention,

FIGS. 2(*a*) and 2(*b*) illustrate by way of phaser diagrams in what manner the circuit according to FIG. 1 operates, FIGS. 3(*a*), 3(*b*) and 3(*c*) show amplitude and phase characteristic curves for the pass channel circuit of FIG. 1, FIG. 4 diagrammatically shows a preferred embodiment of the circuit according to the invention, FIG. 5 shows a diagram for a correction circuit according to the invention as shown in FIG. 4

FIGS. 6 and 7 show different possible modifications of a correction circuit according to the invention, FIGS. 8(*a*) and 8(*b*) show in what manner a phase or amplitude error in the correction circuit according to the invention results in certain disturbances in the amplitude of the output voltage, FIGS. 9 to 12 show in what manner the errors illustrated in FIG. 8 may be eliminated by different modifications of the correction circuit according to FIG. 5, FIGS. 13(*a*) and 13(*b*) show in what manner the differential phase error of a chrominance subcarrier may vary with the magnitude of a video signal on which the subcarrier is superimposed, FIG. 14 shows the shape of the delay curve for different levels of the video signal and the delay curve for a correction circuit, FIG. 15 diagrammatically shows in what manner the correction according to FIG. 14 may be performed with the aid of a delay correction circuit, FIG. 16 shows a suitable embodiment of a delay correction circuit according to the invention, FIG. 17 shows a phase diagram for the circuit according to FIG. 16, FIG. 18 shows a device for correcting the differential phase error which device comprises two delay correction circuits, and the delay curves of the device, and FIG. 19 shows in what manner a desired control voltage can be produced.

The transfer function for an all-pass circuit will generally have the form as shown in equation (I)

$$\frac{U_{ut}}{U_{in}}=\frac{1-j\xi}{1+j\xi} \qquad (I)$$

wherein $U_{in}$ = the input signal of the circuit and $U_{ut}$ = the output signal and $\xi$ is a variable representing the frequency. It is to be noted that the absolute value of the ratio $U_{ut}/U_{in}$ is consequently equal to 1 for all $\xi$ while the phase-shift varies with $\xi$.

FIG. 1 shows in principle how the circuit according to the equation (I) can be realized by means of a parallel resonant circuit. According to FIG. 1, an input voltage $U_{in}$ is applied on the one hand to a first voltage amplifier $A_1$ having a gain factor of 2, and on the other hand to a second voltage amplifier $A_2$ having a gain factor of −1. The output voltage of the first amplifier $A_1$ is applied through a resistor $R_Q$ to a parallel circuit arrangement consisting of a capacitor C and an inductor L. The output voltage U of the said circuit is applied to a first input 1 of a voltage adding device $A_3$. The output voltage of the second amplifier $A_2$ is applied to the second input 2 of the voltage adding device $A_3$. The output signal $U_{ut}$ is derived from the output of the voltage adding device $A_3$ and is formed by the sum of the voltages which are applied to the inputs 1 and 2.

The following relationship exists for the voltages $U$ at the input 1:

$$U=\frac{2U_{in}}{1+jR_Q\left(\omega c-\frac{1}{\omega L}\right)}$$

which can be written as $$U=\frac{2U_{in}}{1+j\xi} \quad \text{(II)}$$

wherein:

$$\xi=Q\left(\frac{\omega}{\omega_0}-\frac{\omega_0}{\omega}\right)$$

$$Q=\frac{R_Q}{\sqrt{L/C}} \qquad \omega_0=\frac{1}{\sqrt{LC}}$$

The sum of the voltages at the inputs 1 and 2 will be equal to $$U_{ut}=u-U_{in}=\frac{2U_{in}}{1+j\xi}-U_{in}$$

$$\frac{U_{ut}}{U_{in}}=\frac{1-j\xi}{1+j\xi} \quad \text{(III)}$$

From this it is evident that equation (III) is identical to equation (1) with the given definition for $\xi$.

FIG. 2(*a*) shows equation (II) represented in the complex plane for some different values of $\xi$. According to FIG. 2 the end of the phasor $U$ describes a circle at a variation of $\xi$ from ∞− to +∞.

FIG. 2(*b*) shows the way of broken lines the phasor $U-U_{in}$ $-U_{ut}$ for the same value of $\xi$. As is shown $U-U_{in}$ is a phasor which starts from the center of the said circle and thus has always the same size, but assumes different phase angles.

FIG. 3 shows the amplitude A, the phase Φ and the delay $\tau'$ for the voltage $U$ as a function of the angular frequency $\omega$. According to the definition $\tau'$ is equal to $-d\psi/d\omega$.

It can be shown that $$\tau'=\frac{\tau'_{max}}{1+\xi^2}$$

wherein $$\tau'_{max}=\frac{2Q}{\omega_0} \quad \text{(IV)}$$

It is evident from FIG. 2(*b*) that the phasor $U-U_{in}=U_{ut}$ for a given change of $\xi$ varies its phase position twice as much as does the phasor $U$ for all values of $\xi$. It follows that the group delay time $\tau$ for $U-U_{in}=U_{ut}$ is equal to:

$$\tau=\frac{\tau_{max}}{1+\xi^2}$$

wherein $$\tau_{max}=\frac{4Q}{\omega_0} \quad \text{(V)}$$

The curve for the delay of the voltage $U_{ut}$ as a function of the angular frequency $\omega$ has in principle the same shape as that shown in FIG. 3 for the voltage $U$, while the phase Φ varies between $+\pi$ and $-\pi$ and the amplitude of the voltage $U_{ut}$ is constant throughout frequency band.

It is to be noted that according to equation (II) the maximum value of the voltage $U$ which is applied to the input of FIG. 1 will be equal to $U_{max}=2U_{in}$.

When $U=U_{max}$, which occurs at resonance, the voltage at input 1 is in phase with the input voltage $U_{in}$. A voltage which according to the foregoing $-U_{in}\Rightarrow -U_{max}/2$ is applied to the second input 2 of the adding device $A_3$. A general rule for the correction circuit described is that the output signal of a parallel resonant circuit fed with a first input signal be combined with a signal of a constant amplitude which is equal to half that of the said first input signal and is in phase opposition therewith, the sum of the signals then having an all-pass characteristic.

Figure 4:
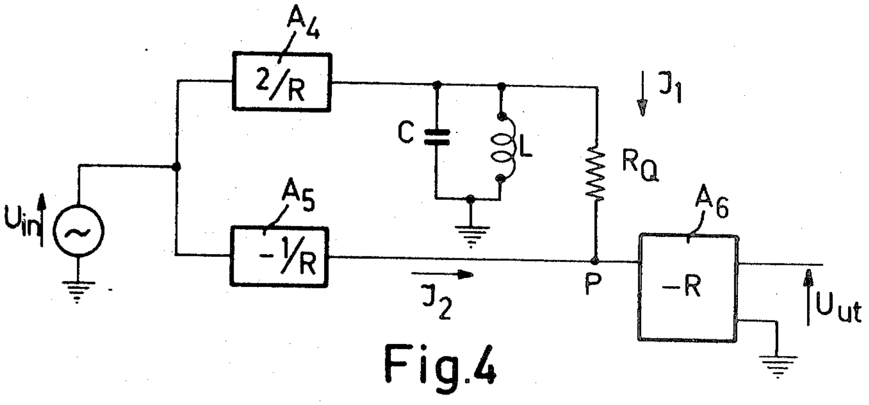

The block diagram of FIG. 1 shows a circuit which has practical drawbacks, inter alia, the voltage adding device should in principle have an infinite resistance and the amplifiers $A_1$, $A_2$ should have an output impedance of zero. FIG. 4 shows a preferred embodiment which has appreciable advantages.

According to FIG. 4 the input voltage $U_{in}$ is applied on the one hand to a first voltage-current amplifier (current generator) $A_4$ having a gain factor of 2/R and on the other hand to a second voltage-current amplifier $A_5$ having a gain factor of −1/R. The current supplied by the first amplifier $A_4$ is applied to a parallel resonant circuit consisting of a capacitor C, an inductor L and a resistor $R_Q$ which resistor $R_Q$ is connected to an input of a current-voltage amplifier $A_6$ having a gain factor of −R. The current supplied by the voltage-current amplifier $A_5$ is directly applied to the input of the amplifier $A_6$. The current-voltage amplifier $A_6$ consists of a voltage amplifier having a high gain factor, the output of which is fed back through a resistor to the input, the input of adding point P being maintained at a low potential as regards the signal voltages. In the following, point P is assumed to be connected to earth as regards signal voltages so that the resistor $R_Q$ for signal voltages is connected in parallel with the capacitor C and the inductor L and forms part of the parallel resonant circuit. The current $I_1$ which flows through the resistor $R_Q$ of the parallel resonant circuit is combined at the input of the amplifier $A_6$ with the current $I_2$ which is obtained from the current generator $A_5$, and the output signal is formed by the sum of these currents multiplied by the constant R.

The circuit according to FIG. 4 has the same transfer function as the circuit in FIG. 1, which will be shown hereinafter.

$$I_1=\frac{U_{in}2}{R}\cdot\frac{1/R_Q}{1/R_Q+j(\omega C-1/\omega L)}=\frac{2U_{in}}{R}\cdot\frac{1}{1+j\xi}$$

$$I_2=-\frac{U_{in}}{R}$$

$$I_1+I_2=\frac{U_{in}}{R}\left[\frac{2}{1+j\xi}-1\right]=\frac{U_{in}}{R}\cdot\frac{1-j\xi}{1+j\xi}$$

$$U_{ut}=R\ (I_1+I_2)$$

$$\frac{U_{ut}}{U_{in}}=\frac{1-j\xi}{1+j\xi}$$

In the same manner as for the circuit of FIG. 1, the resistance $R_Q$ is only present in the imaginary portion of the transfer function and hence will not influence the maximum value of the signal obtained from the resonant circuit. The maximum value of the delay caused by the correction circuit of FIG. 1 or FIG. 4 can be adjusted in a simple manner by varying a single element ($R_Q$) and the position of this maximum value along the frequency scale can likewise be adjusted in a simple manner by varying a single element, for example, the indicator L or the capacitor C. Furthermore the two variations do not substantially influence each other. Thus a variation of L does not produce any change of the maximum value of the delay. It is true that a variation of C causes a change of the delay, but in this case, when the correction circuits are to be used in intermediate frequency amplifiers for TV signals and where the relative frequency variation within the band, for example, between 35 and 40 MHz. is comparatively small, this variation of the maximum value is negligible.

Figure 5:
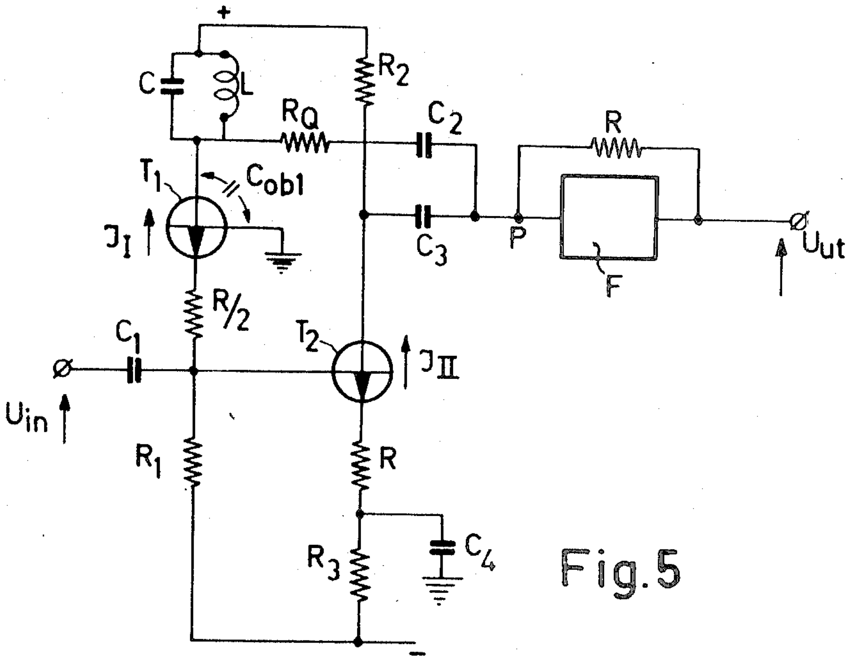

FIG. 5 shows in what manner the circuit which is diagrammatically shown in FIG. 4 can be obtained. The circuit consists of a first transistor $T_1$ which corresponds to the voltage-current amplifier $A_4$ of FIG. 4 and a second transistor $T_2$ which corresponds to the inverting voltage-current amplifier $A_5$ of FIG. 4. The base of the first transistor $T_1$ is connected to earth while the emitter is connected through a resistor R/2 to an input terminal to which the input voltage $U_{in}$ is applied. The tuned circuit C, L, $R_Q$ is arranged in the collector circuit of the transistor $T_1$, the resistor $R_Q$ being connected, as shown in FIG. 4, to the input of the adding amplifier F which is fed back through the resistor R. The base of the second transistor $T_2$ ~ is directly connected to the input terminal while the emitter is connected to earth through a resistor R and a decoupling capacitor $C_4$. The collector of $T_2$ is directly connected to the common adding point P at the input of the fed back amplifier F. The references $R_1$, $R_2$ and $R_3$ are resistors by which the operating points of the two transistors are adjusted, and the references $C_1$, $C_2$ and $C_3$ are coupling capacitors which have a negligible impedance.

The operation of the circuit is as follows:

The transistor $t_1$ provides a current $I_I$ through the resonant circuit which current is equal to $$I_I=\frac{U_{in}}{R/2+r_{e1}}\approx\frac{2U_{in}}{R}$$

wherein $R_{e1}$ is the emitter resistance of the transistor $T_1$. At resonance, the entire current $I_I$ flows through $R_Q$ to the adding point P. A current $I_{II}$ flows through the transistor $T_2$ which current is also applied to the adding point P and is determined by the relation $$I_{II}=-\frac{U_{in}}{R+r_{e2}}\approx-\frac{U_{in}}{R}$$

wherein $r_{e2}$ is equal to the emitter resistance of the transistor $T_2$. The currents applied through $R_Q$ and through the transistor $T_2$ are combined in the point P and the sum of the currents is led through the feedback resistor R. An output voltage $U_{ut}$ is obtained from the amplifier which output voltage is equal to the product of the sum of the currents and the feedback resistor. In the condition of resonance the output voltage will be $$U_{ut}=\left(2\frac{U_{in}}{R}-\frac{U_{in}}{R}\right)R=U_{in}$$

According to the foregoing the amplitude of the output voltage is constant for all frequencies while the phase and the group delay vary according to FIG. 3.

Figure 6:
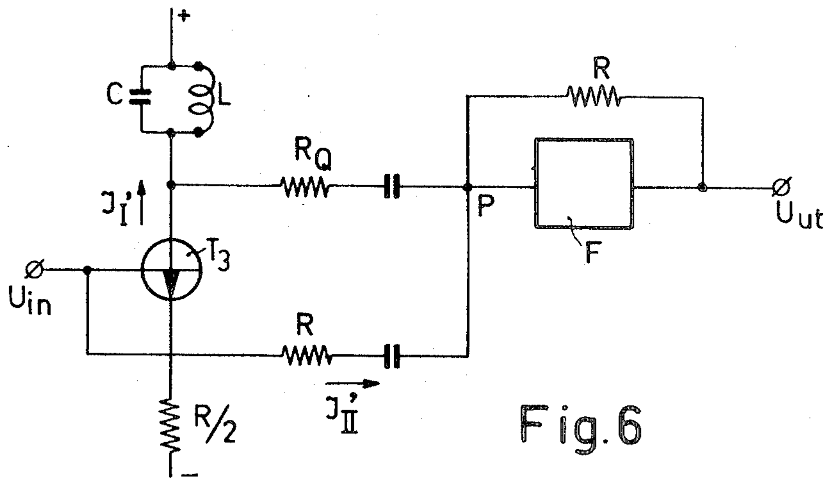

Fig 6 shows a simplified embodiment of the correction circuit according to the invention. The circuit according to FIG. 6 comprises one transistor $T_3$ which serves as a phase inverter stage and as an impedance transformer or current generator. The base of the transistor $T_3$ is connected to the input terminal to which the input voltage $U_{in}$ is applied while the emitter is connected through a resistor R/2 to the negative terminal. The resonant circuit is arranged in the collector circuit of the transistor in the same manner as described hereinbefore. The transistor $T_3$ then provides a current $I_{I'}$ through the resonant circuit which current is determined by the relation $$I_{I'}=-\frac{U_{in}}{R/2}$$

The input terminal is furthermore directly connected to the adding point P through a resistor R. A current $I_{II'}$ is applied through this branch to the adding point P which current is determined by the relation, $$I_{II'}=\frac{U_{in}}{R}$$

At resonance, the current $I_{I'}$ entirely flows through $R_Q$ to the adding point P. The output voltage $U_{ut}$ will then be $$U_{ut}=\left(-2\frac{U_{in}}{R}+\frac{U_{in}}{R}\right)R=-U_{in}$$

Figure 7:
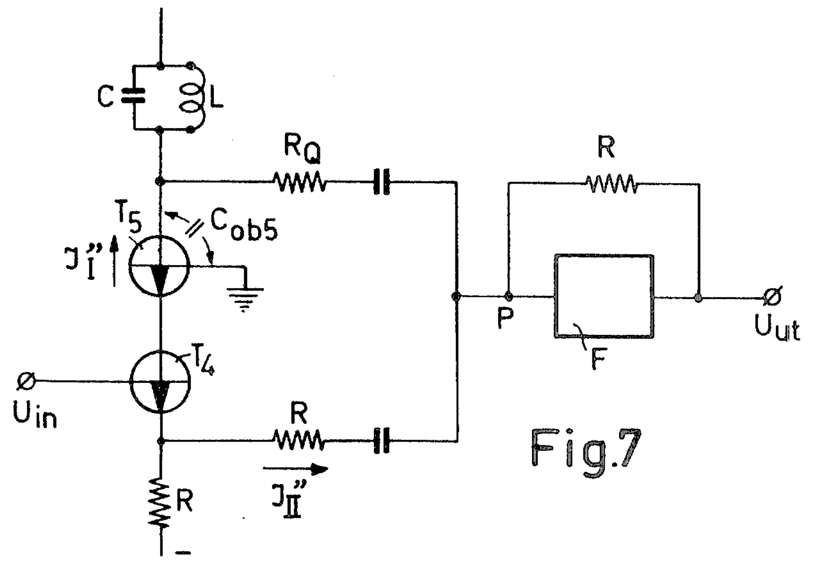

FIG. 7 shows an improved embodiment of the circuit according to FIG. 6. The circuit according to FIG. 7 comprises two transistors $T_4$ and $T_5$ which are arranged in cascode. The base of the first transistor $T_4$ is directly connected to the input terminal to which the input voltage $U_{in}$ is applied while the emitter is connected on the one hand through a resistor R to the negative terminal of the voltage source and on the other hand through the same resistor R to the adding point P. The effective emitter resistance of the transistor $T_4$ will then be equal to R/2. A current $I_{I''}$ will flow through the transistor $T_4$ which current is determined by the relation $$I_{I''}=-\frac{U_{in}}{R/2}$$

which current is applied through the transistor $T_5$ to the resonant circuit. The same voltage as the voltage which is applied to the input terminal, that is to say, $U_{in}$ will appear at the emitter of the transistor $T_4$. This voltage causes a current $I_{II''}$ which flows through the resistor R to the adding~point P and which is equal to $$I_{II''}=\frac{U_{in}}{R}$$

The same output voltage $U_{ut}$ as that in the foregoing is obtained from the output of the adding amplifier.

The circuit according to FIG. 5 and the circuit according to FIG. 7 have the advantage that the voltage-dependent collector-base capacitances $C_{ob1}$ and $C_{ob5}$ of the transistors $T_1$ and $T_5$ which feed the resonant circuit are effectively incorporated therein and therefore have a negligible influence.

When the delay characteristic for a transmission cable must be corrected a large number of the correction circuits described is arranged in cascode. The circuits are then separately adjusted as regards size and position in the frequency band of the additional delay until the resultant delay for the transmission cable and the correction circuits is constant through the actual frequency range.

If the conditions as to phase and amplitude given in FIG. 2 are not fulfilled, this will give rise to undesired variations in the amplitude of the output voltage. This is illustrated in FIG. 8 where the top portion of FIG. 8*a* shows the case of a small phase deviation ΔΦ between the currents or voltages which are added, that is to say, when the current or voltage which is combined with the output magnitude of the resonant circuit is not exactly in phase opposition with the current or voltage of the resonant circuit at resonance. This gives rise to an amplitude characteristic which is shown in the lower portion of FIG. 8(*a*). FIG. 8(*b*) illustrates the case where an amplitude error $\Delta a$ is present, that is to say, the current or the voltage which is combined with the current or the voltage from the resonant circuit is not exactly equal to half the output magnitude of the resonant circuit at resonance. This gives rise to an amplitude characteristic which is shown in the lower portion of FIG. 8(*b*).

Some causes of the errors illustrated in FIG. 8 when using a correction circuit according to FIG. 5 and steps to eliminate these errors will now be described with reference to FIGS. 9 to 12.

In case of inversion in transistor $T_2$ the base-collector capacitance $C_{ob2}$ of the transistor $T_2$ (FIG. 9), if not negligible, will influence the phase of the inverted current and thus cause an erroneous mutual phase relation between the two currents which are combined. According to FIG. 9 this can be compensated for by means of a variable resistor $r$ which is connected to the input line of the transistor $T_2$. The compensation of the error is based on the fact that the case has always also a certain capacitance $C_{bj}$ relative to earth. It can be proved that for each value of $C_{ob2}$ and $C_{bj}$ a value for the resistor $r$ can be found which produces a phase shift such that the current flowing through the transistor $T_2$ is exactly in phase opposition with the input voltage. The phase error which is caused by the base-collector capacitance $C_{ob2}$ is independent of Q and the compensation will therefore be correct for all values of Q.

Particularly when using a controllable impedance element such as a field-effect transistor as a resistor $R_Q$ in the oscillator circuit, but also when using conventional resistors, the resistor $R_Q$ will have a nonnegligible parallel capacitance which gives rise to a mutual phase error between the currents which are combined. This is illustrated in FIG. 10 where the parallel capacitance of the resistor $R_Q$ is indicated by $C_Q$. According to FIG. 10 this phase error is compensated for in that the capacitance $C_Q$ of the resistor $R_Q$ is compensated for by center-earthed symmetric bridge circuit. This circuit is formed because the inductor of the resonant circuit is divided into two subinductors L' and '' the junction of which is connected to earth with respect to signal voltages, and in addition a variable capacitor $C_Q$ is connected between the end of the resonant circuit which is not connected to the resistor $R_Q$ and the adding point P at the input of the amplifier F. The variable capacitance $C_Q'$ is adjusted until it is equal to the capacitance $C_Q$ of the resistor of the resonant circuit so that this will apply a current to the adding point which is equal to the current which flows through the parallel capacitance of the resistor $R_Q$, but is of opposite sign with respect thereto. The phase error which is produced by $C_Q$ is dependent on $R_Q$, that is to say, the Q of the resonant circuit, but the compensation current which added through the capacitor $C_Q$, varies to the same extent with this Q and the compensation applies to all Q-values.

FIG. 10 also shows in what manner the capacitance C of the resonant circuit can be formed by two controllable variable capacity diodes $C_1$, $C_2$ by which the resonant frequency of the circuit can be adjusted electronically by means of a control voltage applied to the variable capacity-diodes.

An amplitude error of the kind described in FIG. 8(*b*) may depend on the fact whether the ratio between the resistors R and R/2 is not exactly equal to the given ratio, or on the fact whether the current gain factors of the two transistors $T_1$ and $T_2$ are not equal. Such an amplitude error is independent of Q and is compensated according to FIG. 11 because the emitter resistance of the transistor $T_1$ has been rendered adjustable. As shown, for example, in FIG. 11, the emitter resistance may be divided into a fixed resistance R' and a variable resistance R'', the latter being adjusted to such a value that the current led through the resistor $R_Q$ to the adding point will be exactly twice as large at resonance as the current which is led through the inverting transistor $T_2$ to the adding point. It is of course alternatively ~ possible to render the emitter resistance of the transistor $T_2$ adjustable. As has been stated, the relevant amplitude error is independent of the Q, and the compensation will apply to all Q-values.

Another amplitude error is caused by losses in the resonant circuit. This amplitude error will be dependent on Q as the voltage across the resonant circuit varies with Q. According to FIG. 12 a compensation of this error is achieved by means of an added branch which comprises a transistor $T_6$ and a resistor $r_q$ which branch is connected in parallel with the resistor $R_Q$ of the resonant circuit. The value of the resistor $r_q$ is adjusted in such a manner that a current is led through this resistor to the adding point which current is equal to the current lost in the loss resistor of the resonant circuit. Since the voltage across the resonant circuit varies with Q, the compensation current which is applied through resistor $r_q$ will likewise vary with Q and the compensation will be correct for all Q-values.

As has been stated, the correction circuit described is principally adapted for use in TV transmitters, but may in principle also be used in TV receivers.

Figure 13:
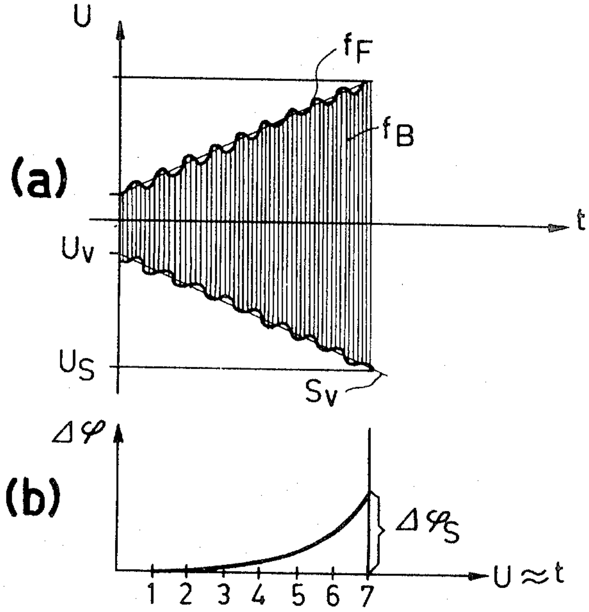

FIG. 13(*a*) shows in what manner a sawtooth voltage $S_v$ representing the video signal (first signal) in a color TV system and a chrominance subcarrier $f_F$ (second signal) superimposed on the video signal are modulated on a carrier $f_B$. This carrier $f_B$ may be of intermediate frequency or ultrahigh frequency. The modulation limits $U_v$ and $U_s$ are chosen to the white level and the black level, respectively.

If the signal shown in FIG. 13(*a*) is applied through a transmission channel in a TV transmitter and the relative phase of the chrominance subcarrier for different modulation levels, that is to say, amplitudes of the carrier is investigated, this will result, for example, in a curve as shown in FIG. 13(*b*). The phase deviation $\Delta\Phi$ of the chrominance subcarrier of a reference phase is called a differential phase error. The reference phase is in this case chosen to be equal to the phase at the lowest amplitude of the carrier which corresponds to the white level. It is evident that the phase deviation in the given example is insignificant up to approximately half the maximum amplitude, but then increases considerably.

Figure 14:
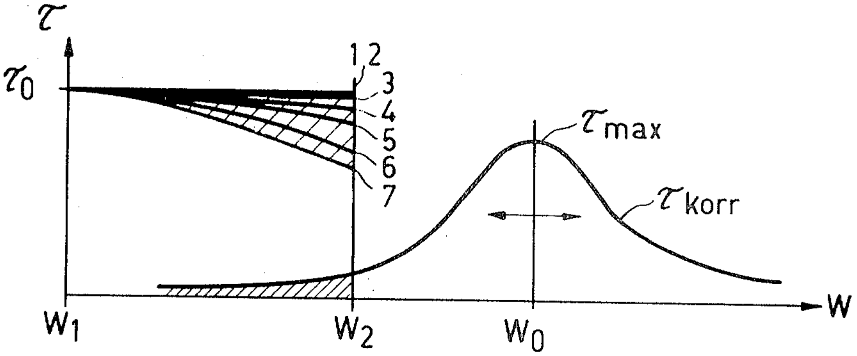

If the delay $\tau$ is measured as a function of the angular frequency $\omega$ in the case illustrated in FIG. 13(*b*) this may result, for example, in the curves shown on the left-hand side of FIG. 14. These are denoted by the reference numerals 1 to 7 and are supposed to be measured at corresponding amplitude levels which have the same reference numerals in FIG. 13(*b*).

According to the definition $$\tau=-\frac{d\varphi}{d\omega} \qquad \text{(VI)}$$

wherein $\Phi$ is the overall phase shift of the transmission line. If only the phase deviation relative to the reference phase, that is to say, the phase at white level amplitude is taken into consideration, equation (VI) can be written after integration as $$\Delta\varphi=-\int_{\omega 1}^{\omega 2}\Delta\tau d\omega \qquad \text{(VII)}$$

wherein $\Delta\Phi$ is the differential phase error and $\Delta\tau$ is the deviation in delay relative to the delay at white level.

According to equation (VII) the differential phase error will be represented in FIG. 14 for each amplitude in the videosignal by the surface which is enclosed between the actual delay curve and the horizontal line $\tau_o$ in the frequency diagram. The phase error $\Delta\Phi_s$ for the highest amplitude of the video signal, that is to say, the black level will thus be proportional to the surface shown in broken lines in FIG. 14(*b*). This also applies to other amplitude levels. According to the invention the differential phase error can be corrected by introducing a correction circuit in the line which circuit produces an addition to the delay. A correct correction requires the integral of the delay curve to be equal to the said integral of the delay curve for the transmission line, which integral is equal to the differential phase error of the transmission line. According to the above the differential phase error varies, however, with the amplitude of the video signal and the correction must therefore vary with the amplitude in the same manner. Mathematically, this can be expressed such that the equation $$\Delta\Phi(U)+\Delta\Phi_{korr}(U)=0 \qquad \text{(VIII)}$$

is satisfied for all values of $U$, wherein $U$ is the amplitude of the carrier and $\Delta\Phi$ and $\Delta\Phi_{korr}$ are the said integrals for the transmission line and the correction circuit respectively, within the actual frequency band. If only the differential phase error is taken into account the condition according to equation (VIII) is sufficient. According to the invention the differential phase error may, however, be corrected by maintaining a constant delay over the actual frequency band and a constant amplitude of the output signal for a given input signal.

The correction is performed by means of an active all-pass circuit which is controllable within certain limits and which may be of a suitable kind as described in FIGS. 1 to 12. An all-pass circuit is then understood to be a circuit which causes a certain addition to the delay within a certain frequency range, but has the same amplification for all frequencies.

Figure 15:
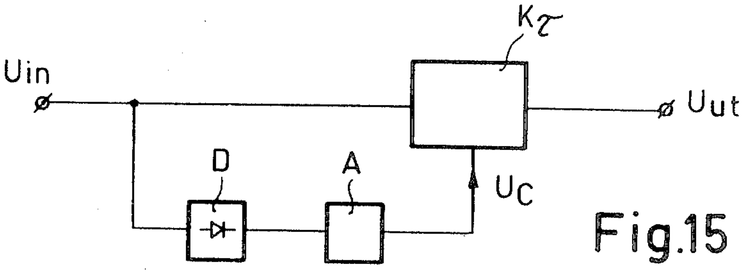

The principal circuit for the correction of the differential phase error according to the invention is shown in FIG. 15. The correction is supposed to relate to the phase error correction in a TV transmitter, and at least one correction device according to FIG. 15 is then connected to the I.F. section of the TV transmitter. The input signal $U_{in}$ is formed by the I.F. carrier together with the video signal and with a superimposed chrominance subcarrier, which signal is applied on the one hand to an active delay correction circuit $K\tau$ according to FIG. 15, which correction circuit will be described in greater detail hereinafter and on the other hand to a demodulator D. The demodulator D supplies an output voltage which varies in its rhythm with the video signal and which is applied to a device A which produces a suitable control voltage $U_c$ from the video signal for the correction circuit $K\tau$. The corrected signal $U_{ut}$ is derived from the correction circuit $K\tau$.

The delay curve for the correction circuit can be seen in FIG. 14, where it is designated $\tau_{korr}$. The delay curve $\tau_{korr}$ is varied dependently on the video signal such that the portion of the curve falling within the actual frequency range $\omega_1$–$\omega_2$ for each value of the amplitude of the video signal is equal to the phase error at the relevant amplitude. In the relevant case the control of the correction circuit is assumed to be performed by a displacement in one or the other direction of the resonant frequency $\omega_o$ of the correction circuit. At an increasing amplitude of the video signal, $\omega_o$ decreases and at a decreasing amplitude, $\omega_o$ increases. The shape of the correction curve $\tau_{korr}$ is furthermore assumed to be such that for each adjustment of the circuit it is complementary to the $\tau$ curve transmission line. Hence the resultant delay across the entire frequency range $\omega_1$–$\omega_2$ will be constant for all amplitudes of the video signal.

Figure 16:
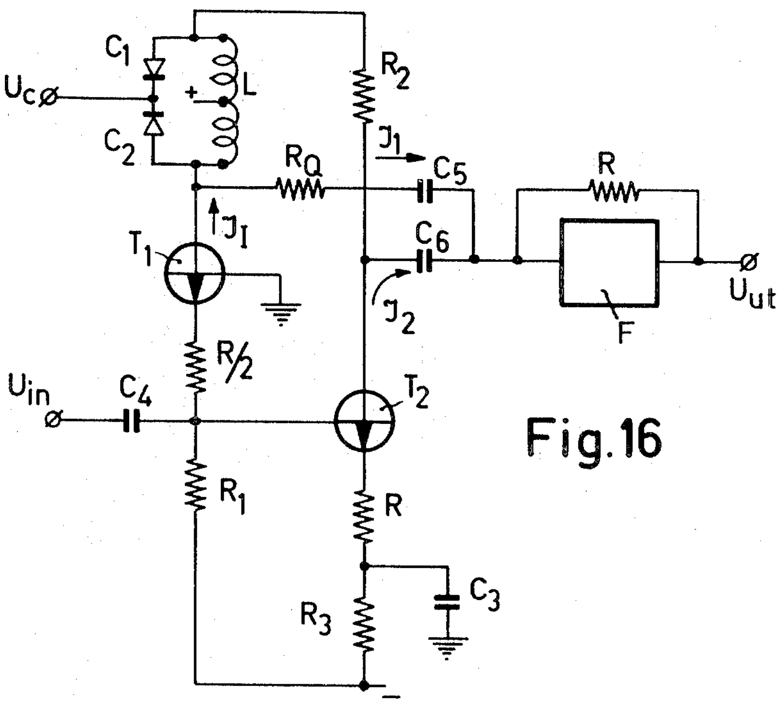

FIG. 16 shows a suitable embodiment of the delay correction circuit $K\tau$. The correction circuit comprises a first transistor $T_1$ which serves as an impedance converter of current generator and a second generator $T_2$ which serves as a phase inverter stage. The base of the first transistor $T_1$ is connected to earth while the emitter is connected through a resistor R/2 to an input terminal to which the combined input signal $U_{in}$ is applied. A parallel resonant circuit $C_1$, $C_2$, L, $R_Q$ is incorporated in the collector circuit of the transistor $T_1$. The references $C_1$ and $C_2$ are two variable capacity diodes which are controlled by the common control voltage $U_c$. $R_0$ is connected to the input of the voltage amplifier F having a high-gain factor, the amplifier F is fed back through a resistor R. A very small signal voltage occurs at the input of the amplifier F, such that it can be considered to be earthed, $R_Q$ being effectively connected in parallel with the parallel arrangement of the capacitors $C_1$, and $C_2$ and the inductor L.

The base of the second transistor $T_2$ is directly connected to the input terminal to which the combined signal $U_{in}$ is applied while the emitter is connected to earth through a resistor R and a decoupling capacitor $C_3$. The collector $T_2$ is directly connected to the input of the feedback amplifier F. The references $R_1$, $R_2$ and $R_3$ are resistors by which the operating points of the two transistors are adjusted and the references $C_4$, $C_5$ and $C_6$ are coupling capacitors.

The operation of the circuit is as follows:

The transistor $T_1$ produces a current $I_l$ through the resonant circuit which current is equal to $$I_l=\frac{U_{\rm in}}{R/2+r_{e1}}\approx 2\,\frac{U_{\rm in}}{R}$$

wherein $R_{e1}$ is the emitter resistance of transistor $T_1$. A part $I_l$ of this current is applied through $R_Q$ to the input of the amplifier F, $I_1$ being determined by the relation $$I_1=\frac{2U_{\rm in}}{R}\cdot\frac{1}{1+jR_Q\left(\omega C-\frac{1}{\omega L}\right)}$$

wherein $C=C_1+C_2$.

The transistor $T_2$ produces a current $I_2$ to the input of the amplifier $$I_2=-\frac{U_{\rm in}}{R+r_{e2}}\approx-\frac{U_{\rm in}}{R}$$

wherein $r_{e2}$ is the emitter resistance of transistor $T_2$.

The sum of the currents $I_1+I_2$ flows through the feedback resistor R of the amplifier and causes an output voltage $$U_{\rm ut}=R(I_1+I_2)=U_{\rm in}\,\frac{1-jR_Q\left(\omega C-\frac{1}{\omega L}\right)}{1+jR_Q\left(\omega C-\frac{1}{\omega L}\right)}$$

which can be written as $$\frac{U_{\rm ut}}{U_{\rm in}}=\frac{1-j\xi}{1+j\xi}$$

wherein $$\xi=Q\left(\frac{\omega}{\omega_0}-\frac{\omega_0}{\omega}\right)$$

$$Q=\frac{R_Q}{\sqrt{L/C}}\qquad \omega_0=\frac{1}{\sqrt{LC}}\qquad\text{(IX)}$$

It is evident from equation (IX) that the amplification $U_{ut}/U_{in}$ is always equal to 1 for all grequencies, whereas the phase varies from $+\pi$ to $-\pi$ when $\xi$ varies from 0 to $\infty$.

Figure 17:
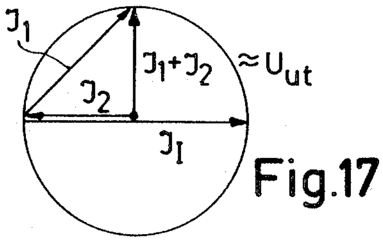

The function of the circuit is illustrated in a phasor diagram in FIG. 17. With respect to size and phase, $I_1$ represents the voltage across the parallel resonant circuit to which a current $I_l=2U_{in}/R$ is applied. However, according to equation (VII) the current $I_1$ will be independent of the value of $R_Q$. When $\omega$ varies from 0 to $\infty$, the phasor $I_1$ varies in size and orientation such that it describes a circle according to FIG. 17. When $\omega$ is equal to 0, the phase of $I_1$ is closed to $+\pi/2$ and when $\omega=\infty$ close to $-\pi/2$, the phase of the current $I_1$ being used as a reference phase. At resonance $$I_1=I_l\,\frac{2U_{\rm in}}{R}$$

that is to say, the entire current $I_l$ flows through $R_Q$ to the fed back amplifier.

According to the foregoing the current which is combined with the current from the resonant circuit is equal to half the maximum value of the said first current and may be shown as is indicated in the phasor diagram of FIG. 17. It is evident that the phasor $I_1+I_2$, which represents the output voltage of the circuit, will start from the center of the said circle, that is to say, it represents a voltage having a constant amplitude but a varying phase. The phase of the output voltage varies from $+\pi$ at $\omega=0$ to $-\pi$ at $\omega=\infty$ and the delay varies according to a curve which in principle corresponds to the curve which is shown on the right-hand side of FIG. 14.

It can be proved that $$\tau_{\rm max}=\frac{4Q}{\omega_0}$$

The magnitude of the addition to the delay produced by the correction circuit is adjusted by a variation of $R_Q$ and the position of the said addition along the frequency scale is adjusted by a variation of the resonant frequency. In the relevant case $R_Q$ is considered to be adjusted at a suitable value during a previous adjustment, while the resonant frequency is varied by exerting influence on the variable capacity diodes $C_1$, $C_2$ in the rhythm of the applied control voltage $U_c$. The resonant circuit is formed as a balanced center-earthed bridge, the control voltage being applied between the junction of the two equal capacitors $C_1$, $C_2$ and the center of the coil L, which coil is connected to earth with respect to signal voltages. As a result nothing of the voltage $U_c$ will appear across the resonant circuit and the voltage $U_c$ does not contribute to the current $I_1$ which is applied to the amplifier F.

Figure 18:
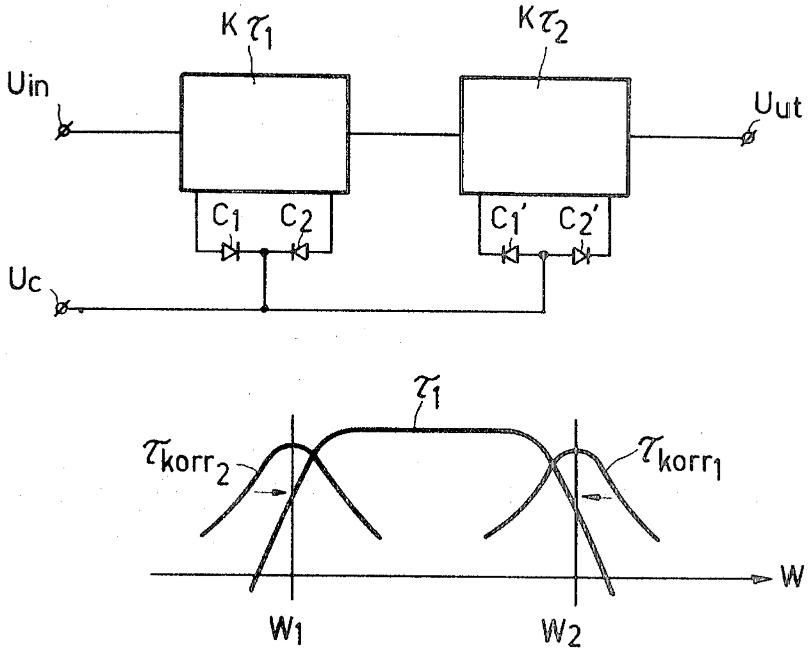

FIG. 18 shows in what manner the differential phase error for a transmission line having a passband characteristic can be corrected with the aid of two delay correction circuits of the kind described. The delay curve for the uncorrected transmission line is shown in the lower part of FIG. 18 where it is indicated by $\tau_1$. The correction circuits are indicated by $K\tau_1$ and $K\tau_2$ and the delay curves for the circuits are indicated by $\tau_{korr\ 1}$ and $\tau_{korr\ 2}$, respectively. The tuning capacitors $C_1$, $C_2$ and $C_1$, $C_2$ of the correction circuits are adjusted by the common control voltage $U_c$, the control being such that at a given variation of $U_c$ the tuning frequency of one of the circuits will increase and that of the other will decrease, that is to say, the tuning frequencies will approach each other or will be more remote from each other dependent on $U_c$.

Figure 19:
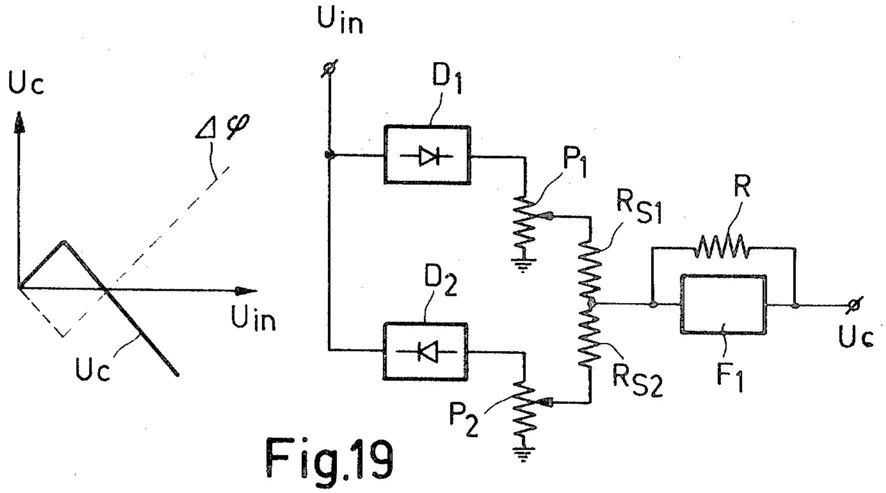

The phase error may vary in different manners, as a function of the amplitude and the correction must be adapted in each separate case to the phase error curve of the associated transmission circuit. FIG. 19 shows in what manner a phase error which changes sign, can be corrected. The phase error of the uncorrected transmission line is assumed to vary according to the curve indicated by a broken line shown on the left-hand side of FIG. 19. If it is assumed that the relation between the phase correction caused by the correction circuit and the applied control voltage is linear, a control voltage $U_c$ will be produced which follows a curve having a function which is opposite to the phase error curve (the curve indicated by a solid line in FIG. 19).

FIG. 19 shows on the right-hand side in what manner such a control voltage can be produced with the aid of two demodulators. The demodulators to which the common intermediate frequency signal is applied are indicated by $D_1$ and $D_2$, respectively. The demodulators comprise rectifier elements which are connected with opposite polarity, so that the first demodulator $D_1$ supplies a positive voltage and the second demodulator $D_2$ supplies a negative voltage. The voltages of the demodulators are applied through potentiometers $P_1$, $P_2$ to an adding device which consists of input resistors $R_{s1}$, $R_{s2}$ and an amplifier $F_1$ which is fed back through a resistor R. The demodulator $D_1$ produces an output voltage which increases linearly with the input amplitude from the value 0 while the demodulator $D_2$ has a threshold value which must be exceeded prior to the demodulator supplying the output voltage. After the threshold value has been exceeded the demodulator $D_2$ applies a voltage to the adding device which voltage increases twice as fast as the voltage of $D_1$. It is evident that the output voltage $U_c$, which is equal to the sum of the input voltages, will then have a shape as is shown on the left-hand side of FIG. 19. Any required nonlinear control voltage function can in principle be produced with the aid of a number of demodulators which have different threshold values and an adding device for adding the output voltages of the demodulators so that the correction can be adapted to any measured phase error curve.

Instead of varying the resonant frequency of the correction circuit, it is alternatively possible to vary the Q-value. This is achieved by controlling the resistor $R_Q$ of FIG. 16 with the aid of a control signal derived from the video signal. The resistor $R_Q$ may then, for example, be formed as a field-effect transistor.

Both when the resonant frequency of the correction circuit and when the Q-value is varied, a large portion of the addition to the delay will lie beyond the actual band limits as shown in the given example. This is dependent on the fact whether the total surface below the delay curve for the correction circuit is constant, and whether the main part of the delay curve of the correction circuit must fall within the band limits of the transmission line, so that only small insignificant variations in phase could be produced.

The invention is not only limited to the delay correction circuit shown, but also any suitable active controllable correction circuit may in principle be used. A requirement is, however, that both the Q-value and the resonant frequency can easily be adjusted and that at least one of the said magnitudes can be adjusted electronically at a speed which allows of control in the rhythm of the video signal.

In addition to color TV transmitters, the method of correcting the differential phase error according to the invention can also be applied in TV receivers, for example, in the receiver circuit of a slave transmitter or in common color TV receivers. It is also possible to utilize the correction method in transmitters or receivers for monochrome pictures, the correction in this case and in the example described being performed at the intermediate frequency level.

What we claim is:

1. A delay distortion correction circuit comprising an input means for receiving an input signal to be corrected; a current source circuit coupled to said input means for supplying an output current depending on said input signal; a parallel resonance circuit coupled to receive said output current; a damping resistance coupled to said resonant circuit; a second resistance coupled to said resonant circuit; a current combination circuit serially coupled to said damping resistance and also coupled to said second resistance; whereby an output signal is obtained from said current combination circuit having a frequency dependent phase relationship and a frequency independent amplitude relationship with respect to said input signal.

2. A circuit as claimed in claim 1, wherein said second resistance comprises the input resistance of said current combination circuit.

3. A circuit as claimed in claim 2 wherein said combination circuit comprises an amplifier having an input and an output, and a negative feedback resistor coupled between said input and said output.

4. A circuit as claimed in claim 1 wherein said current source circuit comprises two transistors coupled in cascode.

5. A circuit as claimed in claim 1 wherein said current source circuit comprises a transistor and an adjustable resistor coupled between said transistor and said input means.

6. A circuit as claimed in claim 1 wherein said parallel resonance circuit comprises a coil having a tap coupled to ground, one end of said coil being coupled through said damping resistance to said current combination circuit; and further comprising a variable capacitor coupled between said combination circuit and the remaining end of said coil.

7. A circuit as claimed in claim 1 wherein said current source circuit comprises two current sources.

8. A circuit as claimed in claim 7 wherein at least one of the current sources is adjustable.

9. A circuit as claimed in claim 1 further comprising a current loss compensation circuit coupled between said resonant and combination circuits.

10. A circuit as claimed in claim 1 wherein said resonance circuit comprises a voltage dependent element.

11. A circuit as claimed in claim 10 further comprising a detection device coupled between said input means and said element.

12. A circuit as claimed in claim 1 further comprising a second resonance circuit tuned to a different frequency than that of said first resonant circuit, each of said resonant circuits having a voltage dependent element; and a detection device coupled between said input means and said elements.

13. A circuit as claimed in claim 11 wherein said detection device comprises two detection circuits of opposite polarity.

14. A circuit as claimed in claim 11 wherein said detection device comprises a plurality of detection circuits each having a different threshold, and an adding circuit coupled between said detection circuits and said elements.

* * * * *